(12) United States Patent
Bodin

(10) Patent No.: US 6,681,989 B2
(45) Date of Patent: Jan. 27, 2004

(54) INVENTORY CONTROL AND POINT-OF-SALE SYSTEM AND METHOD

(75) Inventor: William Kress Bodin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 10/047,094

(22) Filed: Jan. 15, 2002

(65) Prior Publication Data
US 2003/0135417 A1 Jul. 17, 2003

(51) Int. Cl.[7] .............................................. G06K 15/00
(52) U.S. Cl. .................. 235/383; 235/385; 235/375; 705/18; 705/22
(58) Field of Search ................. 235/375, 383, 235/380, 381, 385, 462.13, 462.46, 472.02; 705/16, 17, 18, 21, 22

(56) References Cited

U.S. PATENT DOCUMENTS

| | | | | |
|---|---|---|---|---|
| 4,063,229 A | * | 12/1977 | Welsh et al. ................ | 340/571 |
| 4,527,152 A | * | 7/1985 | Scarr et al. .............. | 340/572.2 |
| 4,539,558 A | * | 9/1985 | Fearon .................... | 340/572.2 |
| 4,642,640 A | * | 2/1987 | Woolsey et al. ............ | 342/187 |
| 4,967,185 A | * | 10/1990 | Montean .................... | 340/572.3 |
| 5,008,649 A | * | 4/1991 | Klein ...................... | 340/572.3 |
| 5,029,291 A | * | 7/1991 | Zhou et al. ................ | 340/551 |
| 5,030,941 A | * | 7/1991 | Lizzi et al. ............... | 340/541 |
| 5,121,103 A | * | 6/1992 | Minasy et al. ............. | 340/551 |
| 5,130,697 A | * | 7/1992 | McGinn .................... | 340/551 |
| 5,376,923 A | * | 12/1994 | Kindschy .................. | 335/284 |
| 5,410,296 A | * | 4/1995 | Montbriand et al. ........ | 335/284 |
| 5,589,820 A | * | 12/1996 | Robinson et al. .......... | 340/572.3 |
| 5,955,951 A | * | 9/1999 | Wischerop et al. ........ | 340/572.8 |
| 5,963,134 A | * | 10/1999 | Bowers et al. ............ | 340/572.1 |
| 6,169,483 B1 | * | 1/2001 | Ghaffari et al. ........... | 340/572.3 |
| 6,313,745 B1 | * | 11/2001 | Suzuki .................... | 340/572.1 |
| 6,507,279 B2 | * | 1/2003 | Loof ....................... | 340/572.1 |
| 2002/0096564 A1 | * | 7/2002 | Bellis et al. .............. | 235/383 |
| 2003/0018897 A1 | * | 1/2003 | Bellis et al. .............. | 713/182 |
| 2003/0040922 A1 | * | 2/2003 | Bodin ...................... | 705/1 |

FOREIGN PATENT DOCUMENTS

| | | | | |
|---|---|---|---|---|
| EP | 435198 A2 | * | 7/1991 | ........... G08B/13/24 |
| WO | WO 8402789 A1 | * | 7/1984 | ........... G08B/13/18 |

* cited by examiner

Primary Examiner—Michael G. Lee
Assistant Examiner—Uyen-Chau N. Le
(74) Attorney, Agent, or Firm—Robert H. Frantz; David A. Mims, Jr.

(57) ABSTRACT

A system and method allowing a consumer to make a purchase within a retail area and to remove that purchased item from the retail area without causing an alarm by an electronic article surveillance (EAS) system. The system first identifies the consumer and the product to be purchased, then validates the selected item. If the selected product is a valid selection, then the system posts the transaction to the consumer's account, optionally including a convenience charge, and commands the EAS to allow removal of the purchased item from the secured retail area, thereby allowing the consumer to make the purchase and avoid waiting for the availability of a human cashier or salesperson.

33 Claims, 3 Drawing Sheets

INVENTORY CONTROL AND POINT-OF-SALE SYSTEM AND METHOD

CROSS-REFERENCE TO RELATED APPLICATIONS (CLAIMING BENEFIT UNDER 35 U.S.C. 120)

This patent application is related to U.S. patent application Ser. No. 09/935,393, filed on Aug. 23, 2001, by William Kress Bodin, which is commonly assigned.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related U.S. patent application Ser. No. 09/935,393, filed on Aug. 23, 2001, by William Kress Bodin, is hereby incorporated by reference in its entirety, including figures.

BACKGROUND OF THE INVENTION

1. Field of the Invention

This invention relates to the arts of inventory control devices and systems, point-of-sale systems, electronic article surveillance, theft control, supply chain management systems, and on-line purchasing systems.

2. Description of the Related Art

As shown in FIG. 1, many retail stores use electronic article surveillance systems ("EAS") (10) to detect and deter theft of products from the retail space or show room floor. These systems, such as Ultra-Max [TM] by Sensormatic Electronics Corporation, may include a number of "pedestals" (12) which are positioned near the exits (18) of the protected retail space, often resembling stylized gates beside doorways, inconspicuous metal loops above exit doors, or even concealed in the floor near an exit.

EAS systems (10) typically use EAS "tags" or labels (16), which consist of small and inexpensive (e.g. disposable) antenna and transmitter systems, operated on acoustic-magnetic principles or by radio frequency technologies. Tags which operate on radio-frenquency-based techniques are often referred to as "RFID", or "radio frequency ID" tags. The tags (16) are affixed to the products (15) to be protected, either though a semi-permanent attachment means or in an adhesive label.

The tags are activated when they are placed in a field $P_1$ emitted by a pedestal (12), such as a short-range RF signal. When activated, the tags (16) transmit a signal to the pedestal (12), which results in an alarm being sounded to alert store personnel to the attempted theft.

In their simplest form, a "dumb" tag may simply be enabled and disabled by a signal transmitted to it by a point-of-sale system. These dumb tags are disabled at the time of check-out by a cashier using a point-of-sale (13) disabling device (14). Any products which enter the proximity $P_1$ of a pedestal (12) which are not disabled cause an alarm to be sounded, signifying a potential theft in progress. These types of simple tags are typically employed to protect items of relatively low retail value, such as certain clothing articles, accessories, etc.

More sophisticated tags, though, may be programmed to include more information about the product. The programming may be done by the manufacturer of the item, or may be done by the retailer using specialized programming tools (17) having a short-range communications capability $P_3$ to the tag (16). The tag program can include an item identification number such as a stock tracking number, stockkeeping unit number ("SKU"), universal product code ("UPC"), product category codes, etc. This tag information may be used by a pedestal controller computer (11) to track which items are being "stolen" most often, at what times, etc.

RF ID tags can also be embedded into credit cards and ID badges and used by automatic door lock activators to provide secure door operations. When a person carrying such a badge or card approaches the door, the badge is place in proximity of the pedestal (12) or "reader", which collects the ID code from the badge and sends it to the pedestal controller computer (11). If the ID code is associated with a person who is entitled to enter or pass through the door (18), the controller (11) provides an unlock signal to an electronically actuated door lock (19). The controller (11) may implement in software a number of other security features, such as tracking of entries and exits, production of access reports, time-based access, etc.

The related patent application disclosed a system and method of using an RF ID or a pervasive computing device to allow the highlighting of products on display according to a shopper's interests or preferences. For example, a shopper can be provided with a store credit card which includes an RF ID device embedded in it. A special pedestal is placed near a point of display, such as a show display. When the shopper nears the display and enters the proximity of the pedestal, the RFID is activated, and the shopper's ID is established. Then, an enhanced controller computer accesses a data store over a computer network to determine if any products on display match the shopper's preferences or interests, such as a certain size, style or color of shoe.

If a match is found, then small indicators such as LED's are activated near the matching products in order to bring the shopper's attention to the products. In a further enhancement of the related invention, the enhanced controller computer can interface to a stores supply chain management ("SCM") or inventory tracking system to determine if a product matching the preferences is actually in stock at the store.

In alternate and more advanced embodiments, the system and method of the related invention employed proximity-enabled pervasive computing devices, such as wireless networked personal digital assistants ("PDA") and handheld computers, and wireless application protocol ("WAP") enabled cellular and PCS telephones instead of the RF ID badge or card for identifying the consumer. Further, in these embodiments, more information such as screens of text and images can be provided to the consumer, instead of a simple indication of a product and/or it's stock availability.

While the related invention has provided certain improvements to a shopping experience, there remain other problems yet unsolved with the experience of shopping and buying products in a "real" or "bricks-and-mortar" environment compared to an online shopping experience. One such problem is the issue of waiting in line for service by a cashier, especially during peak shopping hours.

For example, many video rental stores experience very low customer volumes during the majority of a business day, except the time immediately following the end of the traditional business shift. So, to maintain profitability, the store cannot afford to maintain a large staff throughout the entire day just to accommodate a significant surge of consumer traffic for a 1 or 2 hour period. Consequently, during these peak hours, a consumer may be required to wait in a check out line for many minutes to be serviced by a minimum number of cashiers.

This phenomenon, of course, is not limited to video rental stores. In fact, many types of retail establishments experience peak customer periods correlating to lunch break periods, ends of work shifts, and weekend shopping, including home improvement stores, clothing stores, pharmacies, gift shops, and cleaners.

Therefore, there is a need in the art for a system and method which reduces the personnel support required to service customers through a checkout or cashier process. This system and method must be compatible with current anti-theft and inventory control systems to avoid the requirement of trained personnel to operate point-of-sale theft tag disablers.

BRIEF DESCRIPTION OF THE DRAWINGS

The following detailed description when taken in conjunction with the figures presented herein provide a complete disclosure of the invention.

SUMMARY OF THE INVENTION

The present invention provides a system and method for a consumer to make a purchase within a retail area and to remove that purchased item from the retail area without causing an alarm by an electronic article surveillance (EAS) system. The system first identifies the consumer and the product to be purchased, then validates the selected item. If the selected product is a valid selection, then the system posts the transaction to the consumer's account, optionally including a convenience charge, and commands the EAS to allow removal of the purchased item from the secured retail area, thereby allowing the consumer to make the purchase and avoid waiting for the availability of a human cashier or salesperson.

DETAILED DESCRIPTION OF THE INVENTION

The system and method of the invention provides a means for allowing a customer to use an electronic identification device, such as an RFID-equipped store credit card, or a pervasive computing device, such as a WAP-enabled wireless telephone, to electronically purchase an item on display in an EAS-secured retail space, and to remove that item from the retail space without interaction or service by a salesperson or cashier, thereby providing an enhanced shopping experience with greater experience and reducing a peak-demand for cashiers and sales staff experienced by the retailer.

The consumer is identified by the invention, and the consumer's selected product is indicated by the consumer to the system. The system then validates the purchase, including verifying the selected product is indeed a stocked item and that the consumer's account is in order to complete the purchase. Following validation of the purchase, the antitheft device and system associated with the selected product is configured to allow the consumer to remove the purchased item from the secured premises without initiating an alarm. The consumer's account is then charged for the purchased item, and preferably a convenience charge or handling charge is posted, as well.

Figure 1:
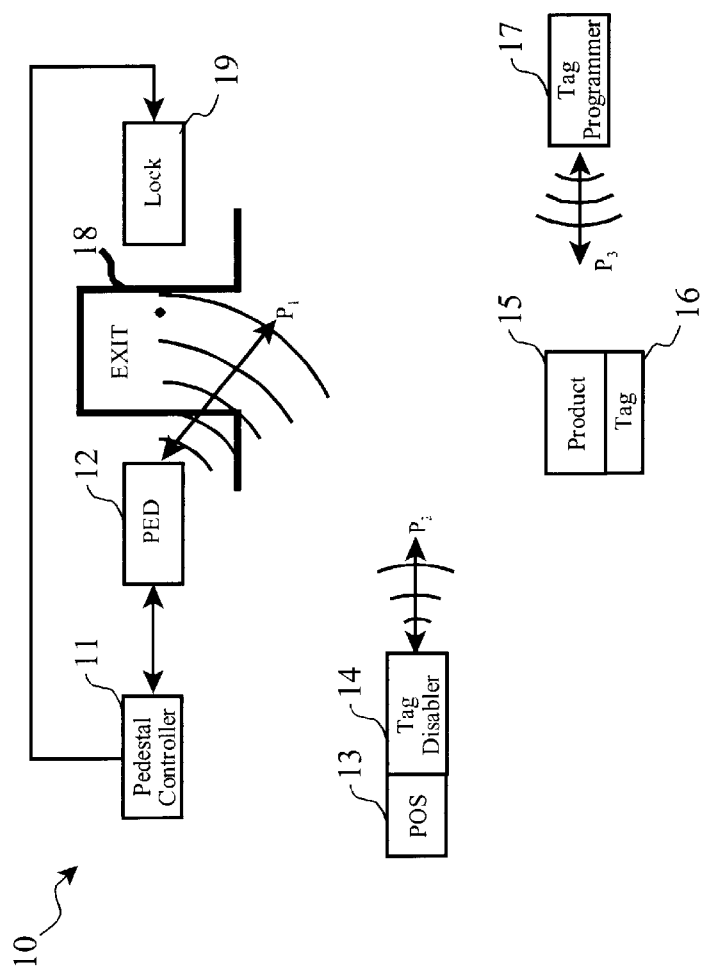
FIG. 1 shows the prior art arrangement of retail antitheft systems, or "electronic article surveillance" systems.
Figure 2:
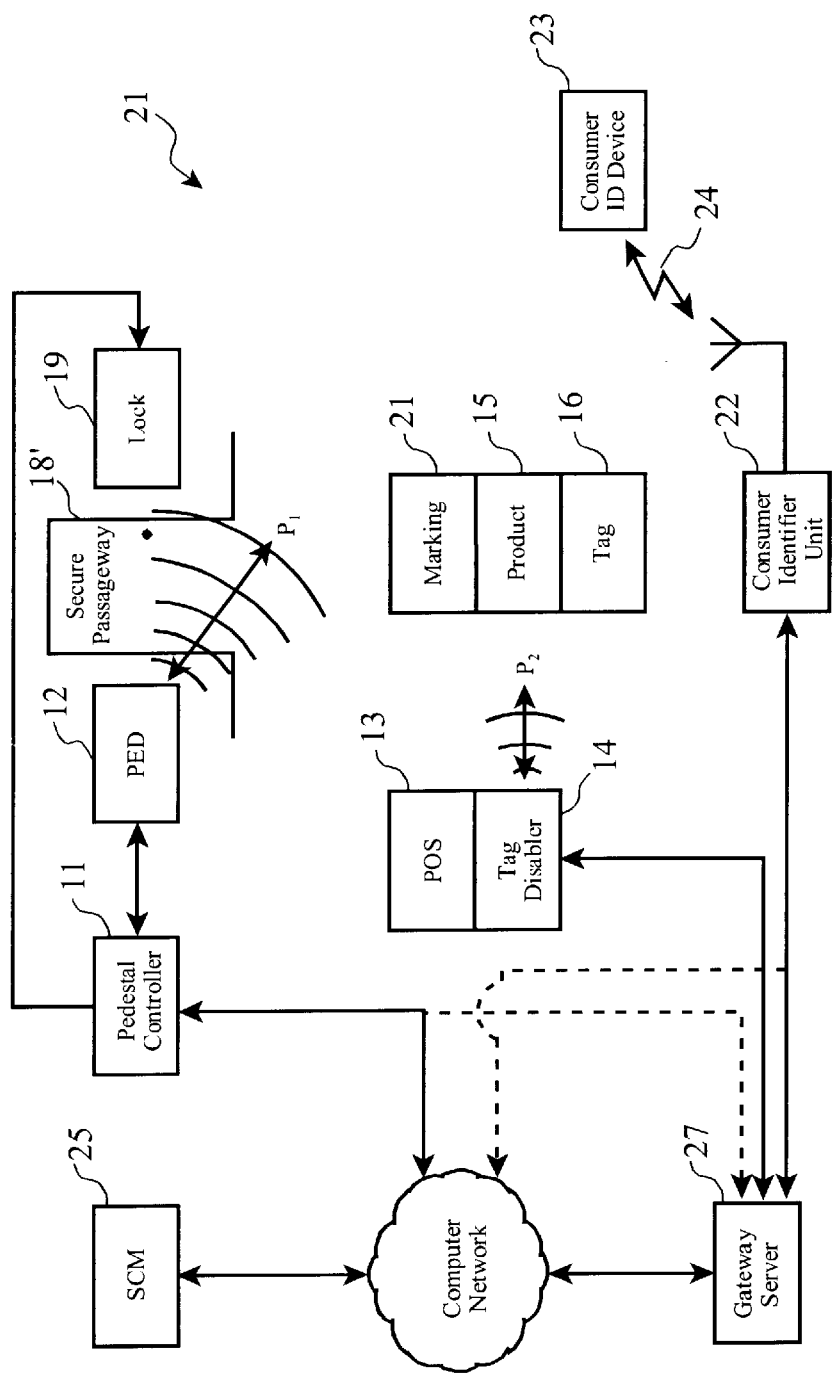
FIG. 2 illustrates arrangement of system components according to the present invention.

Turning to FIG. 2, a generalized arrangement of components and subsystems according to the invention is shown. First, a secure passageway (18'), such as an entrance or exit door, is equipped with a standard pedestal (12) interfaced to a controller (11), and optionally an electronically actuated door lock (19). The store's supply chain management system (25) is enhanced to interface to a gateway server (27), either through a local computer network (e.g. a LAN or WAN) or through the Internet (26). Most SCM systems are already equipped with LAN and Internet interfaces for other purposes, so according to the preferred embodiment, these existing interfaces and messaging protocols are leveraged to provide communications to the gateway server (27).

Further, the gateway server (27) may interface to a point-of-sale (POS) terminal (13) and tag disabler (14), or may provide emulation of these devices to the store's main purchase tracking computer, in order to be able to post a charge to a customer's account and receive approval and authorization for the purchase.

A consumer identification unit ("CIDU") (22) is provided to interface to the consumer's ID device (23). In a basic embodiment, the user may be provided with a credit card, key chain fob, or other article having an RF ID device, and the CIDU (22) may be simply a pedestal positioned within the secured retail space. In the preferred embodiment, the user is provided with a pervasive computing device such as a WAP-enabled telephone, in which case the CIDU may simply be a software "log in" algorithm incorporated into the gateway server (27).

The product to be purchased may be provided with specialized markings, such as a label, indicating that it is available for electronic purchase. Alternatively, standard markings such as SKU or UPC numbers may be used to identify the product to be purchased.

Tables 1 and 2 illustrate the fundamental steps of the process of the invention, with details of two possible embodiments. The first embodiment (Table 1) employs the low-cost RF ID for the consumer identification device (23) and an associated RF ID terminal for the CIDU (22). The second embodiment (Table 2) employs a networked persistent computing device (e.g. WAP-enabled phone, networked PDA, two-way pager, etc.) as the consumer identification device (23).

TABLE 1

Process with First Embodiment using RF ID

| Step | General Action | Embodiment |
|---|---|---|
| 31 | Identify consumer | consumer's RF ID tag moves into proximity of CIDU |
| 32 | Identify product for purchase | a) product RF ID tag moved into proximity of CIDU<br>b) gateway accesses SCM to validate purchase<br>c) gateway confirms purchase choice to consumer through CIDU display |
| 33 | Make purchase transaction | gateway executes purchase transaction with POS or POS emulation, with optional convenience charge |
| 34 | enable product to be removed from secure premises | a) gateway commands pedestal controller to ignore product tag when exiting with consumer's tag, OR<br>b) gateway activates tag disabler near CIDU, OR |

TABLE 1-continued

Process with First Embodiment using RF ID

| Step | General Action | Embodiment |
|---|---|---|
| | | c) gateway enables re-programming of product tag |
| 35 | customer removes purchased item from premises | pedestal detects product and consumer tags but does not initiate alarm |
| 36 | log product as removed by consumer | a) pedestal notifies gateway server via pedestal controller that purchased product has left the premises<br>b) gateway confirms item taken from stock to SCM |

TABLE 2

Process with Second Embodiment using Pervasive Computing Device

| Step | General Action | Embodiment |
|---|---|---|
| 31 | Identify consumer | consumer logs onto web site served by gateway server |
| 32 | Identify product for purchase | a) consumer enters product identifying code (UPC, SKU, etc.) or navigates through selections to find specific product<br>b) gateway accesses SCM to validate purchase<br>c) gateway confirms purchase choice to consumer through CIDU display |
| 33 | Make purchase transaction | gateway executes purchase transaction with POS or POS emulation, with optional convenience charge |
| 34 | enable product to be removed from secure premises | a) gateway commands pedestal controller to ignore product tag when exiting with consumer's tag, OR<br>b) gateway activates tag disabler near CIDU, OR<br>c) gateway enables re-programming of product tag |
| 35 | customer removes purchased item from premises | pedestal detects product and consumer tags but does not initiate alarm |
| 36 | log product as removed by consumer | a) pedestal notifies gateway server via pedestal controller that purchased product has left the premises<br>b) gateway confiuns item taken from stock to SCM |

Figure 3:
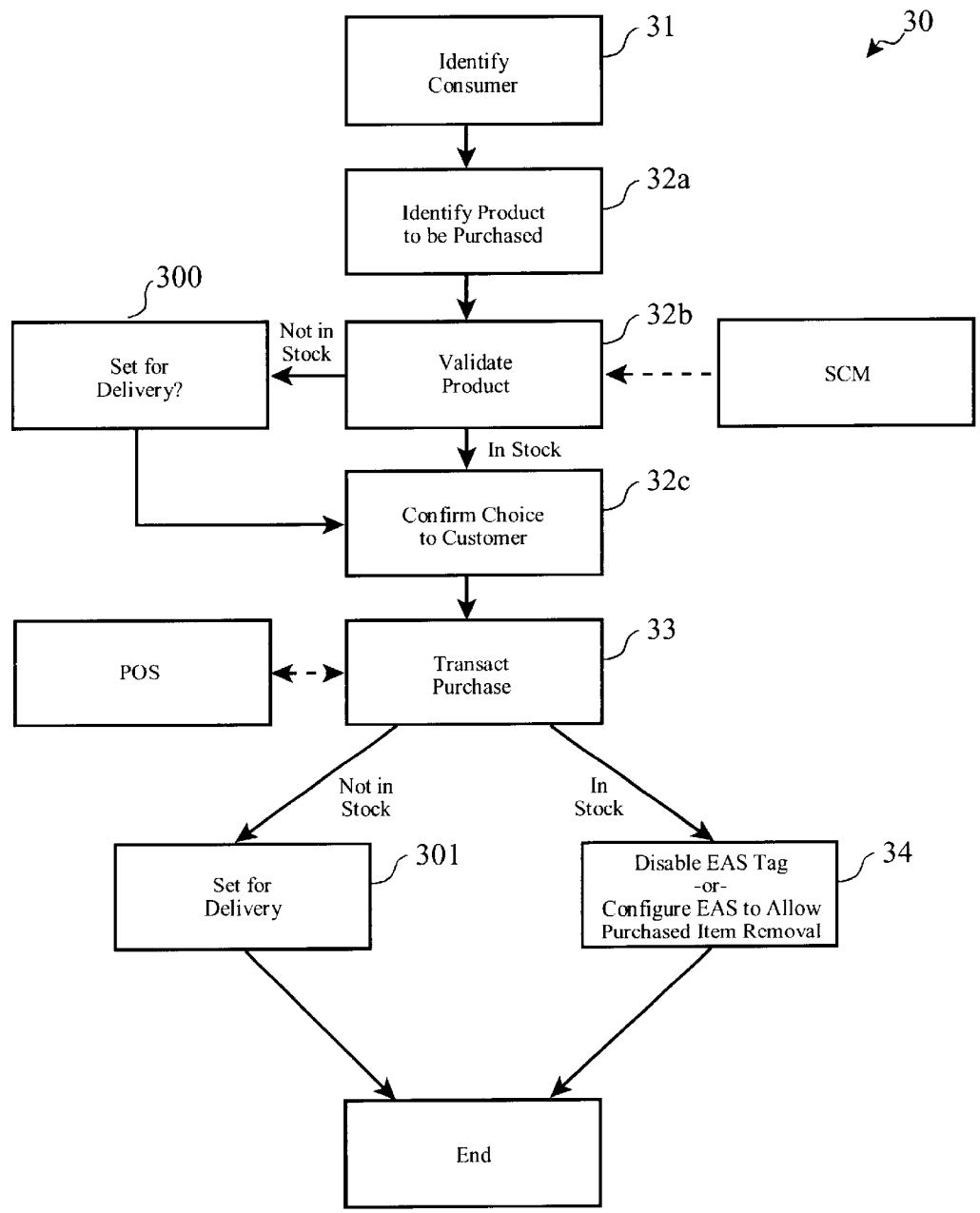
FIG. 3 sets forth the logical process of the present invention.

FIG. 3 illustrates the logical process as set forth in Tables 1 and 2. First, the consumer is identified (31), either through use of an in-store pedestal and an RF ID tag associated with the consumer, or through use of a pervasive computing device, such as by logging on to a web site via a WAP-enabled wireless telephone.

Next, the product is identified (32a) which the consumer wishes to purchase, either by RF ID tag or bar code scanner, or by consumer indication in a form on a web site using a pervasive computing device.

The invention then validates that the chosen product is a valid product choice and that it is in stock by communicating to the store's SCM system (32b). If the product is out of stock, or if it is likely to be difficult to physically be taken by the consumer (e.g. a large item such as a big screen TV), the system may allow the consumer to schedule a delivery time (300). Otherwise, if the product is available in stock, the system may confirm the chosen product to the consumer (32c), and proceed to complete the sales transaction by communicating with the in-store sales system (33).

Finally, if the product is being physically removed from the secured sales area, the system may disable the product's EAS tag or label, or configure the EAS system to allow the removal of one such product when immediately associated with the consumer's RF ID tag upon detection of the exit pedestal (34).

While a preferred embodiment has been disclosed in detail, and wherein certain alternate embodiments and enhancements have been given, it will be recognized by those skilled in the art that some variations and substitutions may be made without departing from the spirit and scope of the invention. Likewise, it will also be readily recognized by those skilled in the art that the examples given herein are for illustrative purposes only, and do not form limitations as to the usefulness, applicability or objectives of the invention. Therefore, the scope of the present invention should be determined by the following claims.

What is claimed is:

1. A method for allowing self-transacted purchases to be coordinated with an electronic article surveillance system, said electronic article surveillance system having a controller computer and at least one exit detection pedestal for initiating an alarm condition and at least one article tag, said method comprising the steps of:

establishing an identity of a consumer at the time said consumer decides to make a purchase;

receiving a selection of a product for purchase to which said article tag is affixed;

validating said selected product is available for purchase;

completing a purchase transaction by posting an amount to an account associated with said identified consumer; and allowing physical removal of said selected product from an area secured by said electronic article surveillance system by prohibiting the initiation of an alarm condition when said article tag is detected near said exit detection pedestal associated with said identified consumer.

2. The method as set forth in claim 1 wherein said step of establishing an identity of a consumer comprises detecting a radio frequency identification device associated with said consumer.

3. The method as set forth in claim 1 wherein said step of establishing an identity of a consumer comprises providing an identification process to a pervasive computing device associated with said consumer.

4. The method as set forth in claim 1 wherein said step of receiving a selection of a product for purchase comprises detecting an RE ID tag affixed to the product.

5. The method as set forth in claim 1 wherein said step of receiving a selection of a product for purchase comprises scanning a bar code affixed to the product.

6. The method as set forth in claim 1 wherein said step of receiving a selection of a product for purchase comprises providing a product selection process to a pervasive computing device associated with said consumer.

7. The method as set forth in claim 6 wherein said step of providing a product selection process to a pervasive computing device associated with said consumer comprises providing a product selection form.

8. The method as set forth in claim 6 wherein said step of providing a product selection process to a pervasive computing device associated with said consumer comprises providing a product selection link on a page to which said consumer may navigate using said pervasive computing device.

9. The method as set forth in claim 1 wherein said step of completing a purchase transaction by posting amount to an account associated with said identified consumer comprises making a credit card transaction.

10. The method as set forth in claim 1 wherein said step of posting an amount to an account associated with said identified consumer comprises posting a surcharge to said consumer account representing a convenience charge or a handling charge.

11. The method as set forth in claim 1 wherein said step of allowing physical removal of said selected product from a secured area comprises disabling said article tag.

12. The method as set forth in claim 1 wherein said step of allowing physical removal of said selected product from a secured area comprises configuring said electronic article surveillance system to allow removal of said selected product when determined to be concurrent with detection of said consumer at said exit pedestal.

13. A computer-readable medium encoded with software for allowing seif-transacted purchases to be coordinated with an electronic article surveillance system, said electronic article surveillance system having a controller computer and at least one exit detection pedestal for initiating an alarm condition and at least one article tag, said software causing one or more processors to perform the steps of:
- determine an identity of a consumer at the time said consumer decides to make a purchase;
- receive a selection of a product for purchase to which said article tag is affixed;
- validate that said selected product is available for purchase;
- complete a purchase transaction by posting an amount to an account associated with said identified consumer; and
- allow physical removal of said selected product from an area secured by said electronic article surveillance system by prohibiting initiation of an alarm condition when said article tag is detected near said detection pedestal associated with said identified consumer.

14. The computer-readable medium as set forth in claim 13 wherein said software for establishing an identity of a consumer comprises software for detecting a radio frequency identification device associated with said consumer.

15. The computer-readable medium as set forth in claim 13 wherein said software for establishing an identity of a consumer comprises software for providing an identification process to a pervasive computing device associated with said consumer.

16. The computer-readable medium as set forth in claim 13 wherein said software for receiving a selection of a product for purchase comprises software for detecting an RE U) tag affixed to the product.

17. The computer-readable medium as set forth in claim 13 wherein said software for receiving a selection of a product for purchase comprises software for receiving a bar code value.

18. The computer-readable medium as set forth in claim 13 wherein said software for receiving a selection of a product for purchase comprises software for providing a product selection process to a pervasive computing device associated with said consumer.

19. The computer-readable medium as set forth in claim 18 wherein said software for providing a product selection process to a pervasive computing device associated with said consumer comprises software for providing a product selection form.

20. The computer-readable medium as set forth in claim 18 wherein said software for providing a product selection process to a pervasive computing device associated with said consumer comprises software for providing a product selection link on a page to which said consumer may navigate using said pervasive computing device.

21. The computer-readable medium as set forth in claim 13 wherein said software for completing a purchase transaction by posting amount to an account associated with said identified consumer comprises software for executing a credit card transaction.

22. The computer-readable medium as set forth in claim 13 wherein said software for posting an amount to an account associated with said identified consumer comprises software for posting a surcharge to said consumer account representing a convenience charge or a handling charge.

23. The computer-readable medium as set forth in claim 13 wherein said software for allowing physical removal of said selected product from a secured area comprises software for commanding said electronic article surveillance system to disable said article tag.

24. The computer-readable medium as set forth in claim 13 wherein said software for allowing physical removal of said selected product from a secured area comprises software for configuring said electronic article surveillance system to allow removal of said selected product when determined to be concurrent with detection of said consumer at said exit pedestal.

25. A system for allowing seif-transacted purchases of products in a retail space secured by an electronic article surveillance system (EAS), said system comprising:
- a consumer identification receiver for receiving a consumer identity value from a consumer identification unit at the time said consumer decides to make a purchase;
- a product selection receiver for receiving a consumer selection of a product for purchase;
- a supply chain management (SCM) interface communicative to a store supply chain management system for performing product validation operations;
- a purchase subsystem interface for posting a transaction to a consumer account;
- an EAS interface communicative to an EAS system; and
- a controller for receiving said consumer identity value and said product selection, validating said product selection, posting a transaction to a consumer account, and commanding an EAS system to allow removal of said selected product from said secured retail space by said identified consumer.

26. The system as set forth in claim 25 wherein said consumer identification receiver is adapted to receive a RF ID value.

27. The system as set forth in claim 25 wherein said consumer identification receiver is adapted to receive a web form input.

28. The system as set forth in claim 25 wherein said product selection receiver is adapted to receive a bar code value.

29. The system as set forth in claim 25 wherein said product selection receiver is adapted to receive a universal product code value.

30. The system as set forth in claim 25 wherein said product selection receiver is adapted to receive a stock keeping unit value.

31. The system as set forth in claim 25 wherein said purchase subsystem interface is adapted to post a credit card transaction.

32. The system as set forth in claim 25 wherein said controller is adapted to command said EAS to disable an EAS-tag associated with said selected product.

33. The system as set forth in claim 25 wherein said controller is adapted to command said EAS to allow EAS-tag associated with said selected product to pass through a protected passageway without initiating an alarm condition.

* * * * *

UNITED STATES PATENT AND TRADEMARK OFFICE
CERTIFICATE OF CORRECTION

PATENT NO. : 6,681,989 B2
DATED : January 27, 2004
INVENTOR(S) : Bodin

It is certified that error appears in the above-identified patent and that said Letters Patent is hereby corrected as shown below:

Column 7,
Line 14, change "REU" to -- RF ID --

Signed and Sealed this

Twenty-seventh Day of April, 2004

JON W. DUDAS
*Acting Director of the United States Patent and Trademark Office*